United States Patent [19]
Maruyama et al.

[11] Patent Number: 5,416,373
[45] Date of Patent: May 16, 1995

[54] ELECTRICALLY INSULATED COILS AND A METHOD OF MANUFACTURING THEREOF

[75] Inventors: Syoichi Maruyama, Yamatsuri; Mitsuo Mashiko, Hitachi; Toru Koyama, Hitachi; Katuo Sugawara, Hitachi; Kenji Mishima, Hitachioota; Shinichi Yamashiro, Hitachi, all of Japan

[73] Assignee: Hitachi, Ltd., Tokyo, Japan

[21] Appl. No.: 66,446

[22] Filed: May 25, 1993

[30] Foreign Application Priority Data

May 26, 1992 [JP] Japan .............................. 4-133998
Sep. 18, 1992 [JP] Japan .............................. 4-249480

[51] Int. Cl.$^6$ .............................................. H02K 3/30
[52] U.S. Cl. ........................................ 310/208; 310/45; 174/110 E
[58] Field of Search .................. 310/43, 45, 179, 208; 336/98, 219; 29/596, 598; 174/110 R, 120 R, 121 R, 121 SR, 110 E, 120 SR

[56] References Cited

U.S. PATENT DOCUMENTS 4,652,218  3/1987  Tsutsui et al. ................ 417/368
5,128,569  7/1992  Gladish ........................... 310/12

FOREIGN PATENT DOCUMENTS

58-72348  4/1983  Japan .
1-122349  5/1989  Japan .
3-37220   2/1991  Japan .
3-77203   4/1991  Japan .

Primary Examiner—Thomas M. Dougherty
Assistant Examiner—Judson H. Jones
Attorney, Agent, or Firm—Fay, Sharpe, Beall, Fagan, Minnich & McKee

[57] ABSTRACT

Electrically insulated coils having excellent moisture resistance or water resistance utilize a simple material that is readily available. Using a simple method of manufacture, rotating electric machines such as motors for driving pumps, traction motors for rolling stocks and the like suitable for use in the outdoors may be built with the electrically insulated coils. The coils are coated with a fluorine-containing coating at least on portions which are exposed out of the side of the core. Since a uniform hydrophobic layer utilizing the repellent action of fluorine atoms is capable of being provided on the surface of the electrically insulated coils, the electrically insulated coils and the rotating electrical machines incorporating them feature excellent moisture resistance and water resistance.

10 Claims, 5 Drawing Sheets

ELECTRICALLY INSULATED COILS AND A METHOD OF MANUFACTURING THEREOF

BACKGROUND OF THE INVENTION

The present invention relates to electrically insulated coils and a method of manufacturing the same, and more particularly it relates to electrically insulated coils suitable for use in rolling stock traction motors, industrial rotating electric machines and the like which demand a high voltage and heat resistance, as well as moisture resistance or water resistance, and to a method of manufacturing the same.

Reflecting increasing demands for compactness and light weight required for rolling stock traction motors and industrial rotating machines in general, electrically insulated coils to be utilized in such applications are required to have a substantially improved insulation performance capable of operating at a higher voltage and at a higher temperature. On the other hand, in order to ensure an efficient utilization of energy, recent rotating electric machines do not necessarily aim at increasing the capacity but rather are moving toward a parallel operation of a plurality of small capacity machines through controlling the number of units in operation in accordance with a varying load demand.

Reflecting this background, manufacturers are increasingly pressed to develop a manufacturing method capable of mass producing in a short period of time at a lower cost a large number of small capacity rotating electric machines having electrically insulated coils capable of withstanding a higher voltage and a higher temperature.

According to prior art rotating electric machinery insulation coils as disclosed in Japanese Patent Application Laid-Open No.3-77203 (1991), an insulation substrate layer is prepared by winding an insulation tape around a conductor, which is then impregnated with an impregnation resin, and cured so as to form an insulated coil. Further, because of the recent development of an epoxide impregnation resin utilizing a multifunctional epoxy, it has become possible to provide electrically insulated coils even by utilizing epoxy resins that can be operated continuously at temperatures exceeding 200° C. As for the composition of such an impregnation resin, it is typical to blend in the resin a hardener such as an acid anhydride which reacts relatively slowly.

Such impregnation resin heretofore has an advantage that its reaction progresses least while on the shelf, but through addition of a curing accelerator for use with said impregnation resin to the insulation substrate layer, the reaction of the impregnation resin is caused to speed up. Through adoption of this method, it has become possible to repeatedly apply the impregnation resin, whereby a yield of applying the impregnation resin has been substantially improved. As curing accelerators suitable to be utilized in such applications, an imidazole catalyst is employed in most cases.

On one hand, in order to manufacture small capacity rotating electric machines in a short time, it is necessary to minimize a hardening schedule for the impregnation resin thereof. For this purpose, and in consideration that the heat resistance of the insulation in the electrical insulation coils largely depends on a heat resistance of the impregnation resin itself, it was necessary to increase the curing temperature such that no insufficient hardening would result, and a predetermined heat resistance was ensured even when the hardening schedule was shortened.

However, in the case where a conventional imidazole curing catalyst was utilized as a hardener accelerator, it was necessary, when forming an insulation having a heat resistance over 200° C. as set forth in Japanese Patent Application Laid-Open No. 3-77203 (1991), to conduct a slow cooling of the impregnation resin at the time of curing by following the steps of 100° C. for 10 hours +150° C. for 3 hours +230° C. for 10 hours, wherein at the initial stage of the lowest temperature a sufficient time was spent cause the hardener accelerator to fully interact with the resin. This slow curing was necessary because of a low heat resistance intrinsic to the curing catalyst itself, even though the yield of the impregnation resin increased as aforementioned.

In this regard, the curing time which required a prolonged time exceeding 20 hours caused a bottleneck in manufacturing the rotating electric machines in a short production time.

On the other hand, lately there has been developed an addition compound type hardener obtained by addition reaction of imidazole and a resin as set forth in Japanese Patent Application Laid-Open No.3-37220 (1991), which has been conceived to solve the drawback of said imidazole curing catalyst having a low heat resistance, and a method of utilizing this hardener as a curing catalyst has been proposed.

This addition reaction product, however, which has an advantage that a greater heat resistance is ensured, nevertheless has a greater molecular weight and thus an increased melting point, and thus has a disadvantage in that it is difficult to dissolve into a solvent and a resin.

Therefore, except for such use in direct blending with a resin as set forth in Japanese Patent Application Laid-Open No. 3-37220 (1991) whereby a sufficient time for blending was afforded thereby enabling practical applications be implemented, it was impossible to apply this art, for example, to the insulation of the rotating electrical machines wherein because of repeated impregnation of the resin required, the curing catalyst could not have been mixed directly with the impregnated resin. As a result, a homogeneous reaction was not ensured inside the insulation layer, and thus it was likely to give a heterogeneous property to the insulation layer, thus precluding actual applications thereof.

On the other hand, along with the development of new insulation materials, the insulation of the electrically insulated coils in the rotating electrical machines has been improved substantially, thus greatly contributing to the improvement of reliability of the machines. In most cases, however, because induction motors for pumps, traction motors for rolling stocks and the like are used outdoors, and often in a high humidity environment, their operational environments are more stringent in comparison with typical induction motors which are installed in doors. Therefore, a high reliability with respect to moisture resistance and water resistance is required for any rotating electric machine to be utilized in such environments. In particular, the insulation of electrically insulated coils to be utilized in such applications is an important technical subject to be dealt with more extensively.

As prior art manufacturing methods for manufacturing electrically insulated coils for rotating electric machines to be applied in such environments, there are known such means and methods as disclosed in the Japanese Patent Application Laid-Open No. 58-72348

(1983), whose method comprises the steps of forming a hot melt adhesive hydrophobic insulation layer on the outer surface of the mica insulation layer, forming a thermally contracting insulation layer thereon, thereafter integrating the same into the core, and performing an integral impregnation treatment. Another method is disclosed in the Japanese Patent Application Laid-Open No. 1-122349 (1987) in its prior art section, in which rotating electric machines are manufactured having a winding provided with an insulation layer on the conductor, a core having slots to insert said winding, a groove provided in the outer peripheral portion of said slot for firmly fixing said winding, and a wedge to be inserted into said groove. After combining the foregoing members, an integral varnish impregnation is performed, and the method comprises the step of coating the wedge with a curing catalyst for curing the impregnated varnish at least on the entire portion of the surface of the wedge which is directly in contact with the core groove prior to the varnish impregnation so as to ensure prevention of outflow of the varnish, or, in the case of the electrically insulated coils manufactured by means of the integral impregnation process, the method comprises the steps of applying the varnish treatment twice, or subjecting to the rotary hardening and the like so as to provide a thicker layer of varnish which thereby serves as a hydrophobic insulation layer as well.

Further, there is also known, as disclosed in Japanese Patent Application Laid-Open No. 58-182443 (1983), to minimize the stress arising due to heat contraction in the coils contained in the slots of a huge rotor core of a rotating electric machine such as a turbine generator and to prevent plastic deformation in the coils from occurring as well, by applying a fluorine-containing coating on the surface of coils for use in the rotator of a rotating machine having coils contained in the slots of the rotor core and supported by wedges via insulation blocks in the radial direction.

SUMMARY OF THE INVENTION

In the foregoing prior art as described in the Japanese Patent Application Laid-Open No. 3-77203, there have been taken into account no particular measures for reducing the hardening schedule so as to attain a reduced production time in the manufacture of electrically insulated coils for use in rotating electrical machines. Also, in the prior art of the Japanese Patent Application Laid-Open No. 3-37220, no particular attention has been paid as to the electrically insulated coils for use in rotating electrical machines. Therefore, there remained a problem to be solved that electrically insulated coils for use in rotating electrical machines operable at a higher voltage and at increased temperatures now in demand could not have been manufactured in a shorter production time as desired by merely aggregating the foregoing both methods.

On the other hand, because the hydrophobic insulation tape winding process for forming a hydrophobic insulation layer requires a winding treatment work in addition to the mica tape insulation treatment, a large sum of material cost and an increased number of processes. Further, such methods requiring varnish impregnation twice or rotary drying are inadequate in terms of a working efficiency, besides they involved such problems that facilities required become large-scale, and the like.

Further, because the prior art method of providing the fluorine-containing coating layers on the surfaces of coils to be mounted inside the slots of the huge rotor core in the turbine generator was intended originally to improve slidability between a plurality of coils positioned inside the insulation block, i.e., main insulation, and in the slot armature, thereby to minimize the stress produced at the time of heat contraction of the coils or to prevent the plastic deformation of the coil due to a centrifugal force from taking place, it has been difficult to apply the foregoing arts as they were to the rotators of rotating electric machines such as induction motors, traction motors for rolling stocks and the like in which insulated coils are disposed partially extending out of the core at one side thereof.

The present invention has been conceived and implemented in consideration of the foregoing, and its first object is to provide electrically insulated coils capable of operating at a high voltage and high temperatures and which are manufactured in a minimized production time, and a method of manufacturing the same.

Further, the second object of the invention is to provide electrically insulated coils featuring excellent moisture resistance or water resistance and a method of manufacturing the same, which have been realized by forming a hydrophobic layer, utilizing a convenient, readily available material and a convenient method, on the whole portion of the electrically insulated coils which are disposed in the core of a rotating electric machine, such that a portion of the coils is exposed at one side of the core, or forming the same at least on said exposed portion.

In order to accomplish the foregoing first object, an impregnation resin for impregnating the electrically insulated coils according to the invention comprises a combination of a thermosetting impregnation resin having a main ingredient and a hardener, and a hardening accelerator for accelerating hardening of the thermosetting impregnation resin, and wherein the hardening accelerator is an addition reaction product obtained by adding a curing catalyst and a resin.

Further, in order to ensure a homogeneous reactivity to be provided for the hardening accelerator (i.e., the addition compound) within the insulation layer, one ingredient of the impregnation resin and the resin component of the hardening accelerator are made of the same resin.

Further, as a method for treating with the addition compound, i.e., hardening accelerator, it is proposed that an insulation tape be prepared which has been uniformly coated with the compound beforehand, or that the insulation tape be dipped before its use into a solvent for dissolving said addition compound such that the entire portion of the insulation tape is uniformly coated with the addition compound prior to its use.

That is, since the impregnation resin is composed of a combination of the thermosetting impregnation resin having the main component and the hardener, and the hardening accelerator for accelerating curing of the thermosetting impregnation resin, a reaction rate of the resin can be controlled by means of the hardening accelerator, thereby allowing a repeated application of the impregnation resin.

Further, by making the hardening accelerator an addition compound of the curing catalyst and the resin, the hardening accelerator is allowed to have an improved heat resistance, whereby the curing time can be greatly reduced by increasing the curing temperature.

Still further, by ensuring that one ingredient of the impregnation resin and the resin ingredient of the hardening accelerator are made of the same resin, improved compatibility is achieved between the impregnation resin and the hardening accelerator without a need of blending the hardening accelerator and the impregnation resin beforehand, thus ensuring a homogeneous reaction to take place even within the insulation substrate layer.

Furthermore, since the hardening accelerator can be applied uniformly beforehand onto the insulation tape, or the insulation tape can be treated by dipping into the solvent which dissolves the addition compound (i.e., hardening accelerator) prior to its use, it is possible to obtain electrically insulated coils having a high voltage resistance and a high heat resistance through the simple method as described heretofore.

On the other hand, in order to accomplish the foregoing second object of the present invention, the electrically insulated coils to be inserted into the slots of the core, with part of the coils to be disposed extending out of the side of the core, comprise the insulation layer formed by winding an insulation film or mica tape therearound, and having a fluorine-containing coating at least on the outermost layer of said exposed portion.

Further, the present invention comprises the steps of providing a core having slots and electrically insulated coils to be inserted into said slots in such a manner that a portion of the coils is disposed extending out of said core at one side thereof, forming an insulation layer by winding an insulation film or a mica tape around said electrically insulated coils, thereafter inserting said electrically insulated coils having been insulated as above into the slots of said core, applying a varnish treatment as required, and coating at least said exposed portion of the electrically insulated coils with a fluorine-containing coating.

As a modification of the foregoing manufacturing method, an insulation film or a mica tape may be wound around the electrically insulated coils, followed by application of a fluorine-containing coating having a water repellent property, and insertion into the core of the electrically insulated coils having said insulation layer formed thereon.

Further, it may be arranged such that the varnish treatment is applied prior to the application of the fluorine-containing coating.

Since, a fluorine-containing coating can be applied by diluting with an appropriate solvent, it can be uniformly coated on any surface having a complicated form such as electrically insulated coils, and in addition, a unique property characteristic of fluorine atoms contained in the coating, that is, a tendency to exhibit little interaction with an external substance (water, for instance) can be provided to the surface of the electrically insulated coils. In other words, with a water repellent surface layer being formed on the surface of the insulated coils, it is possible to obtain electrically insulated coils having excellent moisture resistance or water resistance. As the result, a preferred rotating electrical machine capable of operating in a stringent condition requiring moisture resistance or water resistance can be obtained.

The following effects and advantages have been realized by adopting the electrically insulated coils and the method of manufacturing the same according to the present invention, wherein since the thermosetting impregnation resin to be impregnated and cured in the wound conductors (having been wound via interstage insulation and in the insulation layers having been wound around the conductors) comprises the main ingredient and the hardener, and since the hardening accelerator for accelerating curing of the foregoing thermosetting impregnation resin is provided as an addition compound including the curing catalyst and the resin, the reaction rate of the resin is capable of being controlled by means of the hardening accelerator, and thereby the impregnation resin is capable of being applied repeatedly. In addition, the hardening accelerator being provided as the addition compound of the curing catalyst and the resin, thus enhancing the heat resistance of the hardening accelerator, the hardening temperature thereof can be increased so as to shorten the curing time thereof substantially, thereby ensuring to provide electrically insulated coils having the same levels of a high withstand voltage and a high heat resistance as conventional types, even if the hardening schedule is substantially shortened.

Further, according to another embodiment of the present invention, the following advantages have been realized by utilizing a simple material readily available and through a simple method of applying a fluorine-containing coating on the surface of the electrically insulated coils such that a uniform hydrophobic layer utilizing the intrinsic repellent action of fluorine atoms is provided to the surface thereof. Electrically insulated coils having excellent moisture resistance or water resistance are thus readily obtainable, and rotating electric machines such as induction motors for pumps and traction motors for rolling stocks suitable for use in the outdoors or in a stringent environment at a high humidity are thereby obtainable.

BRIEF DESCRIPTION OF THE INVENTION

DESCRIPTION OF PREFERRED EMBODIMENT

With reference to the accompanying drawings and the following examples, the present invention will be set forth more in detail.

Figure 1:
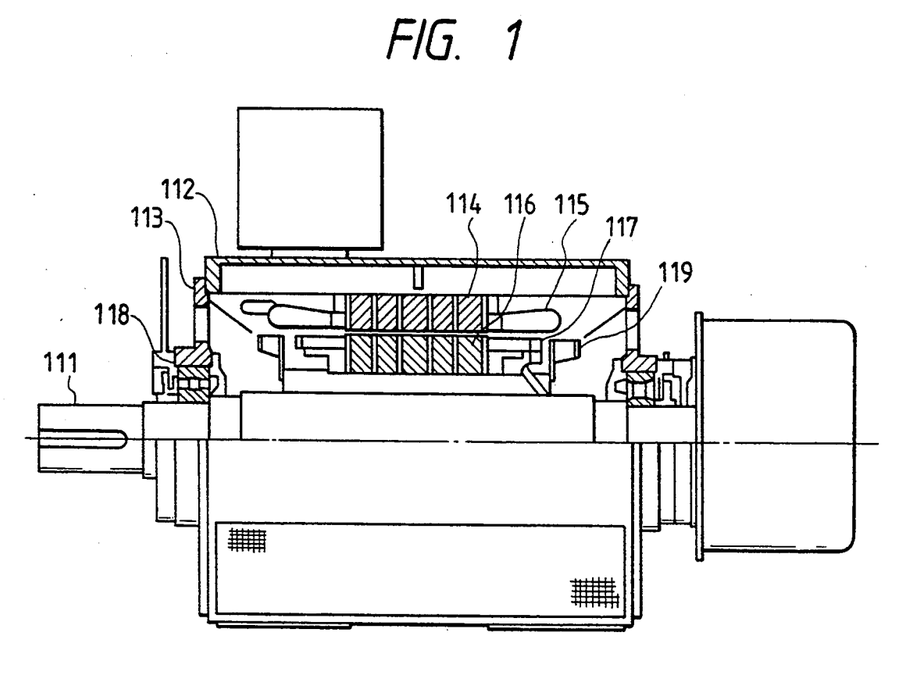
FIG. 1 shows a half cross-sectional view of a rotating electric machine to which the electrically insulated coils of the invention have been applied.

First, in FIG. 1 is illustrated a schematic constitution of an induction motor, i.e., a rotating electric machine to which electrically insulated coils according to the invention are applied.

Numeral 111 indicates a rotation axis which is movably supported by bearing 118. Further, rotor coils 117 and rotor cores 116 rotate about the rotation axis 111.

On the other hand, a stator comprising stator coils 115 and stator cores 114 is disposed opposite the rotor with a predetermined spacing therebetween, and the stator is supported by a stator frame 112. Further, 113 designates a bearing bracket which supports the bearing 118, and numeral 119 designates a cooling fan for supplying cooling air to cool off the inside of the machine.

Next, one embodiment (hereinafter referred to as Embodiment A) of the electrically insulated coils that has been prepared according to the invention to be adopted as the stator coils 115 or rotor coils 117 in an electric rotating machine having the foregoing constitution will be described with reference to FIG. 2 and FIG. 3, which illustrates a manufacturing flowchart thereof.

Figure 3:
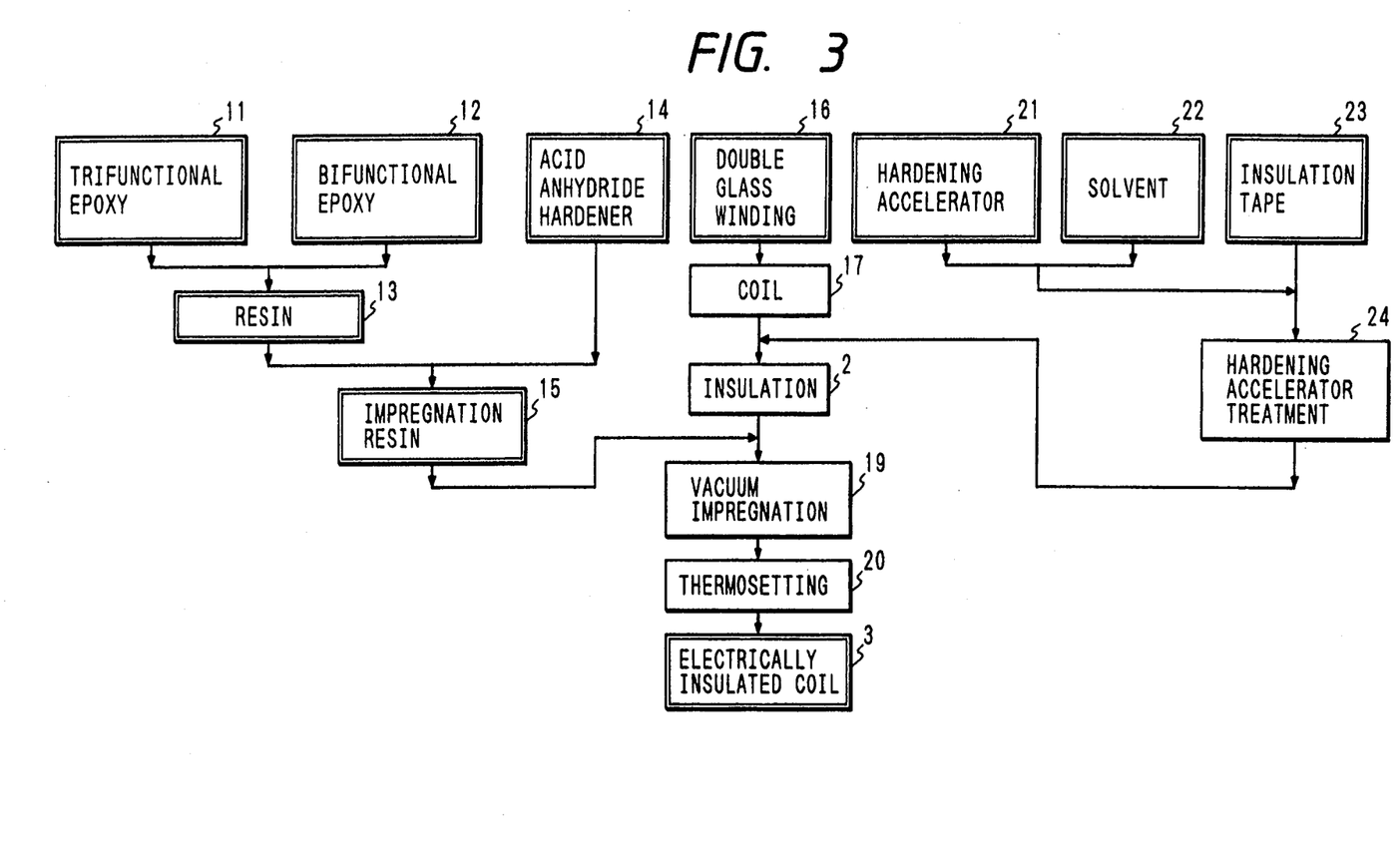
FIG. 3 is a flow chart illustrating the manufacturing processes for manufacturing embodiments A and B according to the invention.

With reference to the flowchart of FIG. 3, a trifunctional epoxy (such as YL-932 of Yuka-Shell Epoxy make) 11 and a bifunctional epoxy (such as Epikote 828 of Yuka-Shell Epoxy make) 12 were admixed in a weight percentage of 1:2 to form a resin 13, and then this resin 13 and an acid anhydride (such as MHAC-P made by Hitachi Kasei KK) 14 were blended in an equivalent ratio of 0.9 to 1 to produce an impregnation resin.

Then, a double glass winding 17 having a double glass insulation 16 serving as an interstage insulation for a conductor was prepared by winding a plurality of turns, and further insulation tapes 23 of a heat resistant film backing mica tape (having a thickness of 0.13 T), and of a glass plain woven tape (having a thickness of 0.1 T) were prepared first by dipping into a solution 22 (for instance, methanol) which contains a hardening accelerator 21 (for instance Epikure P-200 of Yuka-Shell Epoxy KK make) at a concentration of 2%, which is an addition reaction product obtained through addition reaction of imidazole curing catalyst and Epikote 828 (which is the same epoxy resin as one of the components of the aforementioned impregnation resin 15), thereby subjecting the insulation tapes 23 to hardening acceleration treatment 24. Thereafter, the solvent 22 was volatitized therein.

Figure 2:
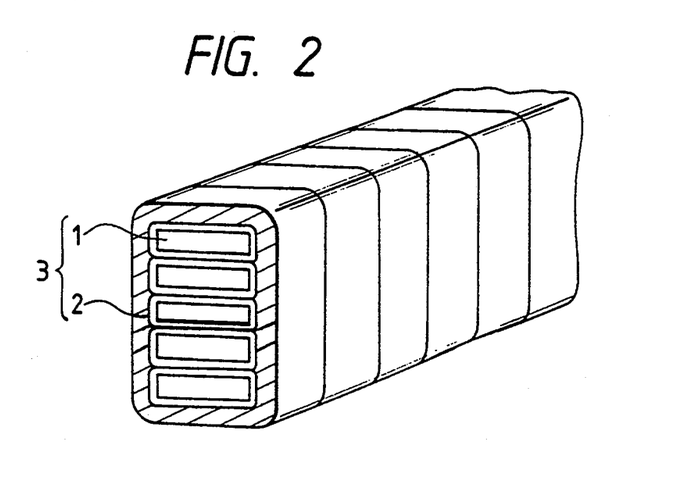
FIG. 2 is a perspective cross-sectional view of one embodiment of an electrically insulated coil according to the invention.

Next, around the outer portion of the conductor 1 as shown in FIG. 2 were wound the aforementioned heat resistant film backing mica tape, three times in half-lapping, and then the glass plain woven tape was wound one turn in half-lapping so as to form the insulation layer 2.

Then, the winding was vacuum impregnated at step 19 with the foregoing impregnation resin 15, which was followed by heat hardening 20 in accordance with a hardening schedule at 160° C. for 3 hrs +230° C. for 10 hrs consequently to manufacture the final products of electrically insulated coils 3.

Another embodiment of electrically insulated coils according to the invention (hereafter referred to as Embodiment B) has been formed which differs from Embodiment A in one point as follows.

(1). As its hardening accelerator, a different type of hardening accelerator (Epikure-100 made by Yuka-Shell Epoxy KK) has been employed, which is an addition reaction product obtained through addition reaction of an imidazole curing catalyst and Epikote 828, which is the same epoxy resin as included in the components of the aforementioned impregnation resin.

Still another embodiment of electrically insulated coils according to the invention (hereafter referred to as Embodiment C) has been formed which differs from Embodiment A in one point as follows.

Figure 4:
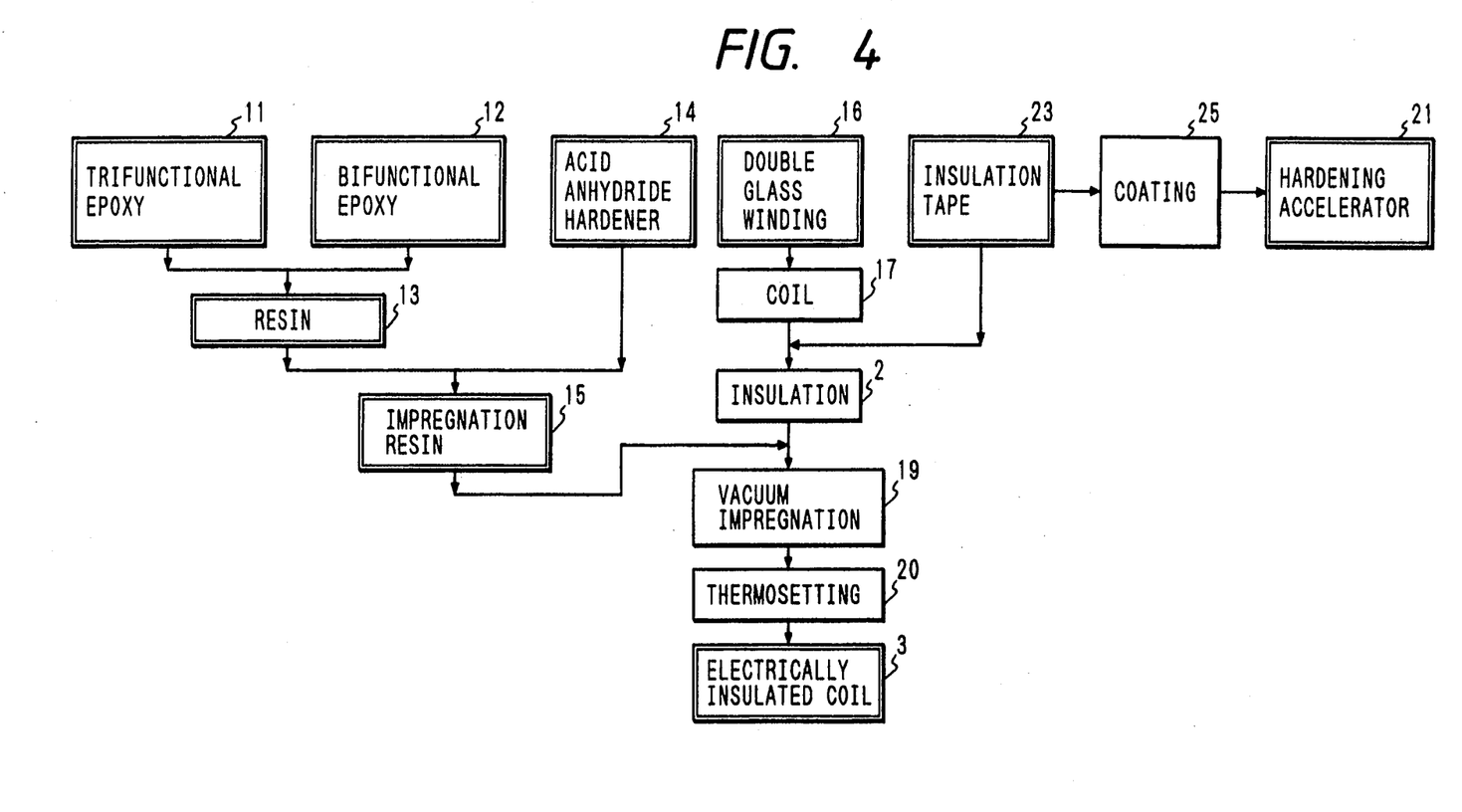
FIG. 4 is a flow chart illustrating the manufacturing process for manufacturing embodiment C of the invention.

(1) With reference to FIG. 4, a mica tape was utilized in this embodiment, which was prepared by uniformly applying Epikure P-200 in advance to provide a coating of 2.5 g/m$^2$ as a hardening accelerator 21 for use with the impregnation resin on the insulation tape 23 made of the heat resistant film backing mica tape at step 25.

Further as an example of prior art coils, electrically insulated coils which are different from the aforementioned one embodiment of the invention in the following two points were formed for the purpose of comparison.

(1) An imidazole curing catalyst (such as 2E4MZ of Shikoku Kasei make, for instance) was utilized as a hardening accelerator.

(2) The hardening schedule followed was: 100° C. for 10 hrs + 150° C. for 3 hrs + 230° C. for 10 hrs.

Next, the results of comparison of the aforementioned embodiments A, B, C and the prior art example A are shown in Table 1, where breakdown voltages across the insulation layers were measured values obtained with an electrode being wound around the exterior of the insulation layer. Further, glass transition temperatures Tg of the insulation layer were measured values obtained with specimens which were cut out from respective insulation layers of electrically insulated coils which had undergone dielectric breakdown.

TABLE 1

| items | kinds | | | |
|---|---|---|---|---|
| | Embodiment A | Embodiment B | Embodiment C | Prior Art A |
| Manufacturing conditions | | | | |
| Manufacturing flowchart | FIG. 3 | FIG. 3 | FIG. 4 | FIG. 3 |
| Hardening accelerator | Epikure P-200 | Epikure P-100 | Epikure P-200 | 2 E 4 MZ |
| Hardening conditions | 160° C. for 3 hrs +230° C. for ten hours | The same as left | The same as left | 100° C. for ten hours +150° C. for 3 hrs +230° C. for 10 hrs |
| Properties of insulation layer | | | | |
| Breakdown voltages (kV) | 28~29 | 27~30 | 26~27 | 26~30 |
| Glass transition temperature (°C.) | 210 | 206 | 206 | 208 |

As a result, it was confirmed that breakdown voltages of the insulation layers of Embodiments A, B and C of the electrically insulated coils of the invention were at the same levels respectively as the breakdown voltages of the insulation layers of electrically insulated coils according to the prior art, and the glass transition temperatures Tg of the insulation layers of the insulation have a high heat resistance exceeding 200° C.

As set forth heretofore, any method of embodiments of the invention offer an advantage that even if the hardening schedule was reduced to half of the conventional schedule, preferable electrically insulated coils having a high voltage resistance and a high heat resistance substantially equivalent to the conventional level are capable of being manufactured readily.

Further, although the foregoing one embodiment of the invention has been applied only to such a process where electrically insulated coils were manufactured on a singular basis, the same effect has been confirmed also for such a process where electrical insulation coils prior to the impregnation resin processing were assembled into the core, then the electrical insulation coils and the core were subjected to an integral impregnation resin processing.

A preferred embodiment for accomplishing the second object of the invention will be set forth in the following.

Figure 5:
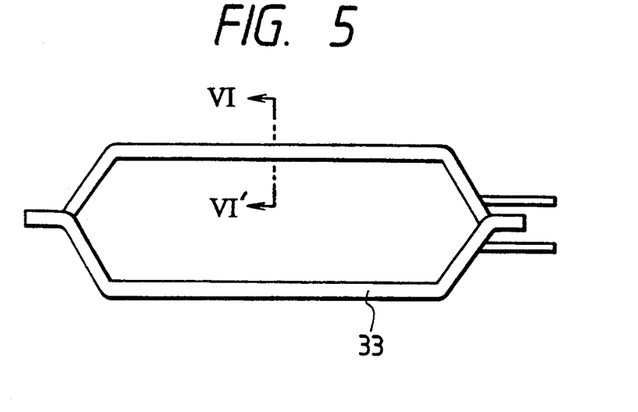
FIG. 5 is a plan view of electrically insulated coils of one embodiment of the invention.
Figure 6:
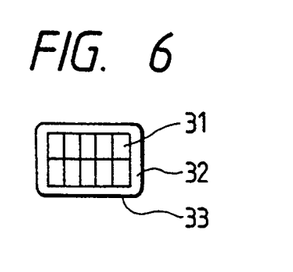
FIG. 6 is a cross-sectional view taken out along line VI–VI' of FIG.5.
Figure 9:
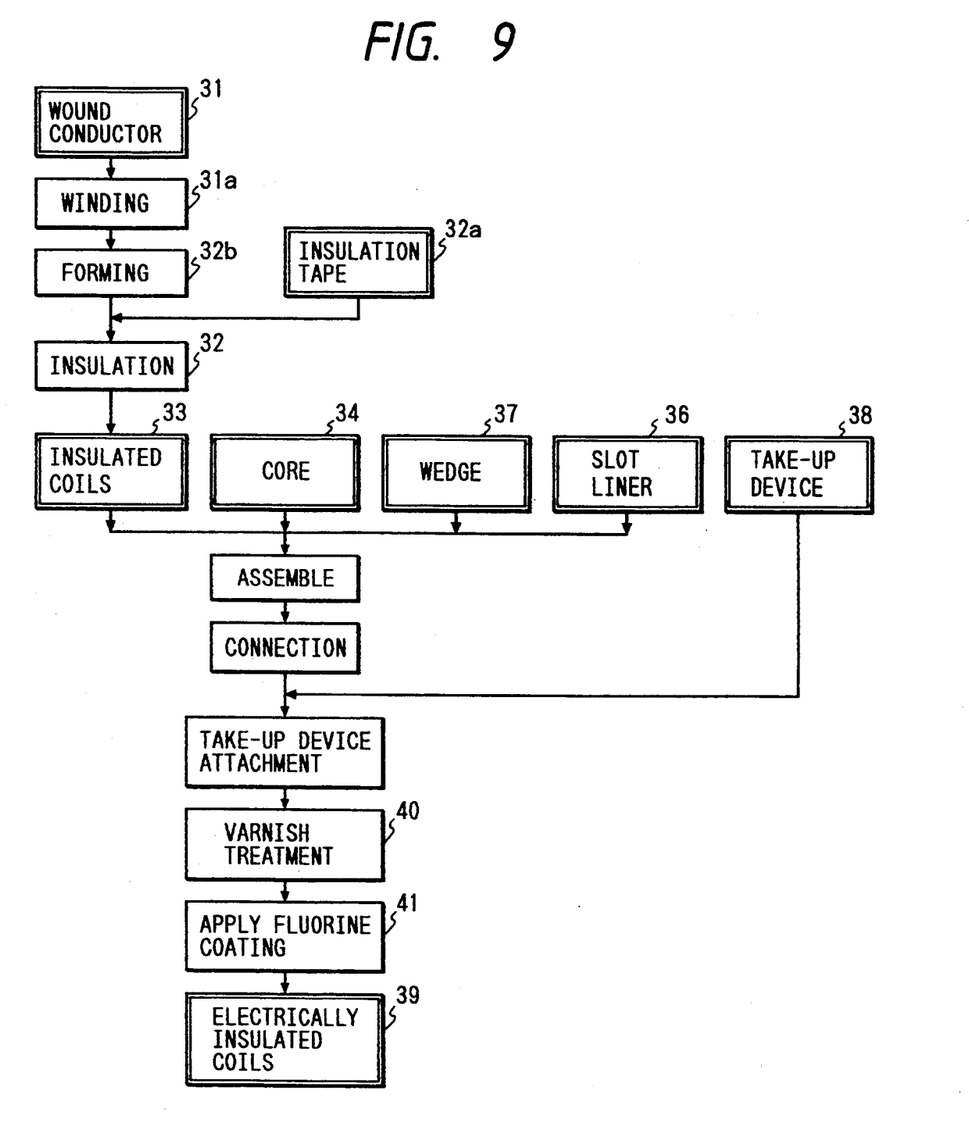
FIG. 9 illustrates a manufacturing process flow chart for manufacturing electrically insulated coils according to the teachings of the invention.

FIG. 9 illustrates a manufacturing process flow chart of manufacturing electrically insulated coils 3 in order to accomplish the second object of the invention. In this embodiment of the invention, glass coated copper wires were wound several turns in bifilar winding (preferably 5 times) to form a wound conductor 31 were wound as shown in FIG. 5 (at step 31a), and formed (shaped) at step 31b. In the next step, an insulation tape 32a, for example, of a polyester film backing mica tape was wound three turns in half-lapping around the wound conductor 31, which was formed into the foregoing shape as shown in FIG. 6, so as to form an insulation layer 32. Further, around the same a glass tape was wound one turn in half-lapping to complete insulation layer 32, consequently forming the electrically insulated coils 33.

Figure 7:
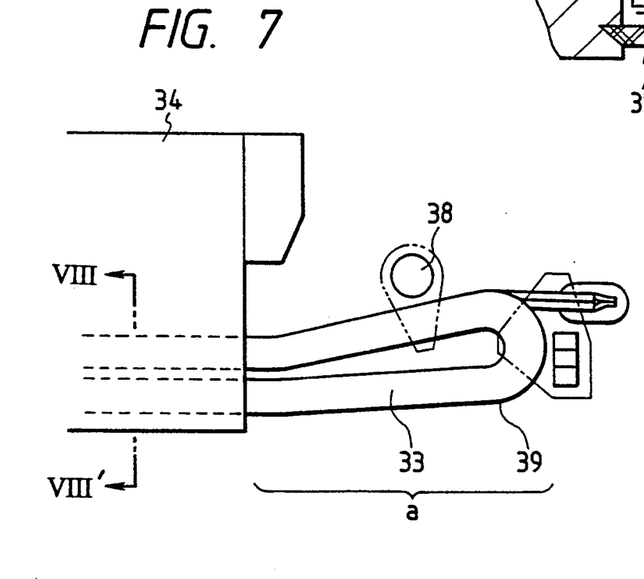
FIG. 7 is a partial frontal view of a rotating electric machine of the invention.
Figure 8:
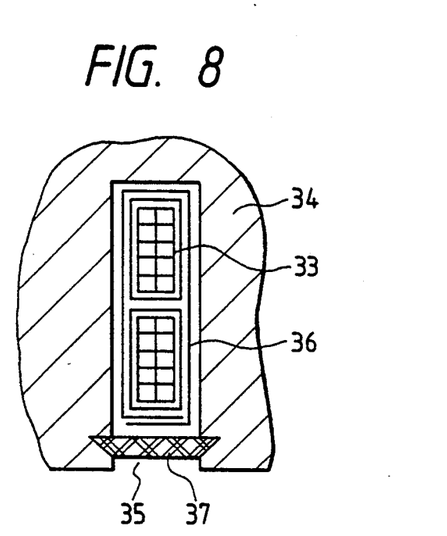
FIG. 8 is a cross-sectional view taken along line VIII––VIII' in FIG. 7.

In the next step there were prepared a core 34, a slot liner 36 made of polyamide paper, and a wedge 37 manufactured of an epoxy glass lamination plate. Then, the foregoing electrically insulated coils 33 were inserted into a plurality of slots 35 formed in the core 34 in such a manner that both side portions a (only one side portion of which is shown—see FIG. 7) of the foregoing electrically insulated coils 33 were exposed out of the core 34 at both sides thereof. At this time, with the slot liner 36 disposed so as to intervene between the peripheral wall inside the slot 35 and the electrically insulated coils 33, a wedge 37 was inserted into a groove provided at the outer periphery of each slot 35. Then, respective electrically insulated coils 33 inserted into each slot 35 were connected together at portions outside core, and, a take-up device 38 was provided in such a manner that the same mica tape as the insulation layer 32 of the electrically insulated coils was wound in a half-lap, one turn around a ring made of SUS, and further around which a glass tape was wound one turn in a half-lap to provide additional insulation. The take-up device was then attached to the coils and subjected to the varnish treatment 40 once and hardened by static drying.

Thereafter, a fluorine-containing coating 41 (such as Bonnflon #1000 made by Asahi Glass Coat and Resin KK) was spray-coated on the whole portion of the core 34, the electrically insulated coils 33 and the like, thereby producing the final product of electrically insulated coils 39.

Utilizing the foregoing core 34 and the final product of electrically insulated coils 39, a rotating electric machine was manufactured according to a typical manner thereafter.

On the other hand, in order to confirm the effectiveness of the invention and for the purpose of comparison, a prior art rotating electric machine having moisture resistant electrically insulated coils according to a prior art was manufactured in which a varnish treatment utilizing epoxy impregnation varnish instead of the fluorine-containing coating was applied twice to give a thicker layer on an arrangement having the same constitution as the foregoing embodiment so as to provide a hydrophobic insulation layer.

Then, insulation properties of the electrically insulated coils of both rotating electrical machines were evaluated after being subjected to a wet heat deterioration test having a cycle of 200° C. for four days+a hygroscopic deterioration test at 40° C., 95±5% for 20 hrs. After performing ten cycles of the above tests, both electrically insulated coils were immersed in water for 24 hrs, and then their insulation resistances as immersed in water were measured. It was thus confirmed that both retained an insulation resistance exceeding 2000 MΩ after 24 hours immersion in water.

From the foregoing results, it was confirmed that according to a simple method comprised of merely applying the fluorine-containing coating of the invention, rotating electric machines having electrically insulated coils with adequate moisture resistance or water resistance are capable of being manufactured.

It should be readily understood that the present invention is not limited to the foregoing preferred embodiments of the invention, but includes many modifications within the scope and spirit of the invention, which may also include, for example, the impregnation method which performs varnish treatment on insulation coils separately and incorporates the coils into the core, provided that the insulated coils after separate varnish treatment are coated with the fluorine-contained coating, followed by corporation into the core, or that on the insulated coils after separate varnish treatment and following the incorporation into the core, the fluorine-containing coating is applied on the whole portion of the core and the electrically insulated coils in the same manner as in the integral impregnation method so as to realize manufacturing of the electrically insulated coils.

Further, preferred materials for the slot liners, wedges and the like are not limited to those described above, but may include any materials which have been utilized and suitable for the purposes of the invention. In short, the invention is not limited by any of the details of description, unless otherwise specified, but rather should be construed broadly within its spirit and scope as set out in the accompanying claims.

We claim:

1. An electrically insulated coil having a wound conductor wound via an interstage insulation, an insulation layer wound around said conductor, a thermosetting impregnation resin to be impregnated and cured in the wound conductor, and a hardening accelerator impregnated in the insulation layer for accelerating curing of the thermosetting resin, wherein said thermosetting impregnation resin comprises a main component and a curing agent, and wherein said hardening accelerator is an addition compound comprising a curing catalyst and a resin.

2. An electrically insulated coil as claimed in claim 1, wherein said thermosetting impregnation resin contains the same resin as the resin of said hardening accelerator.

3. An electrically insulated coil as claimed in claim 1, wherein said thermosetting impregnation resin is an acid anhydride hardening epoxy resin which is prepared by combining an epoxy resin and an acid anhydride hardener.

4. An electrically insulated coil as claimed in claim 1, wherein said hardening accelerator is an addition compound of an imidazole curing catalyst and an epoxy resin.

5. A rotating electrical machine having a stator, stator coils installed in slots of said stator, rotor coils disposed in rotor slots in a magnetically coupled relationship with said stator coils, and a rotor supported rotatably in a concentric relationship with said stator, wherein one of said stator coils and rotor coils comprise a wound conductor wound via an interstage insulation, an insulation layer wound around said conductor, a thermosetting impregnation resin to be impregnated and cured in the wound conductor, and a curing accelerator, impregnated in the insulation layer for accelerating curing of said thermosetting resin, wherein said thermosetting impregnation resin comprises a main component and a hardener, and wherein said hardening accelerator is an addition compound comprising a curing catalyst and a resin.

6. An electrically insulated coil to be inserted into a slot of a core in such a manner that a portion of said coil is exposed extending out of said core at one side thereof, wherein said electrically insulated coil comprises an electrical insulation layer formed by winding one of an electrical insulation film and a mica tape around a coil of wire, and a fluorine-containing coating only on an outermost layer of the electrical insulation layer, said outermost layer being coated at least on said exposed portion of said electrically insulated coil.

7. A method of manufacturing electrically insulated coils comprising the steps of providing a core having slots and electrically insulated coils to be inserted into said slots such that a portion of the coil is exposed extending out of said core at one side thereof, forming an insulation layer by winding an insulation film or a mica tape around said electrically insulated coils, thereafter inserting said electrically insulated coils into the slots of said core, applying a varnish treatment, and coating said electrically insulated coils with a fluorine-containing coating at least on said exposed portion of said electrically insulated coils.

8. A method of manufacturing electrically insulated coils, comprising the steps of providing a core having slots and electrically insulated coils to be inserted into said slots such that a portion of the coil is exposed extending out of said core at one side thereof, forming an insulation layer by winding one of an insulation film and a mica tape around said electrically insulated coils, applying a varnish treatment, coating said electrically insulated coils with a fluorine-containing coating, and thereafter inserting said electrically insulated coils into the slots of said core.

9. An electrically insulated coil as claimed in claim 2, wherein said thermosetting impregnation resin is an acid anhydride hardening epoxy resin which is prepared by combining an epoxy resin and an acid anhydride hardener.

10. An electrically insulated coil as claimed in claim 2, wherein said hardening accelerator is an addition compound of an imidazole curing catalyst and an epoxy resin.

* * * * *